July 21, 1925.  1,546,792
H. PERROT
FRONT WHEEL BRAKE
Filed July 24, 1922  3 Sheets-Sheet 1
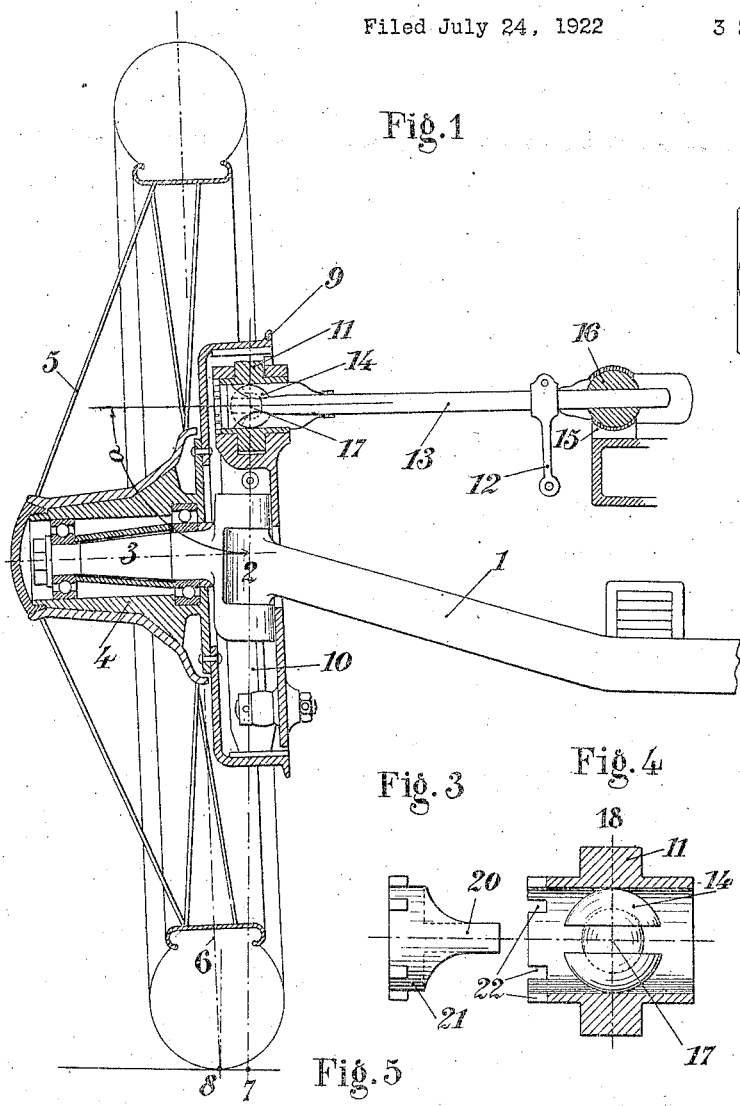
Fig.1
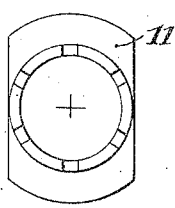
Fig.2
Fig.3  Fig.4
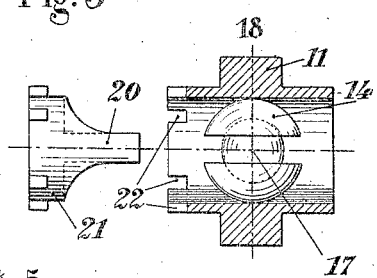
Fig.5
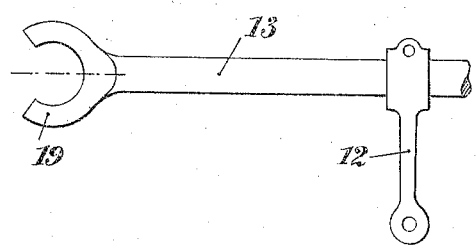
Inventor
H. Perrot
By Marks & Clerk
Atty's

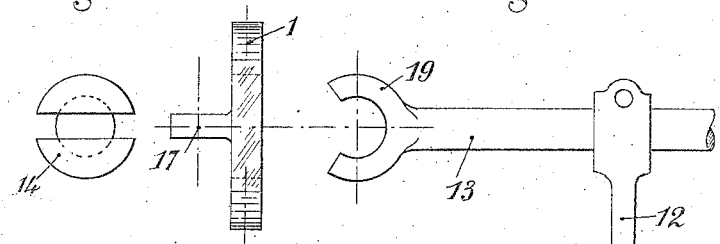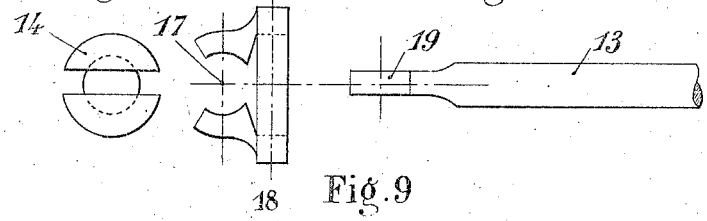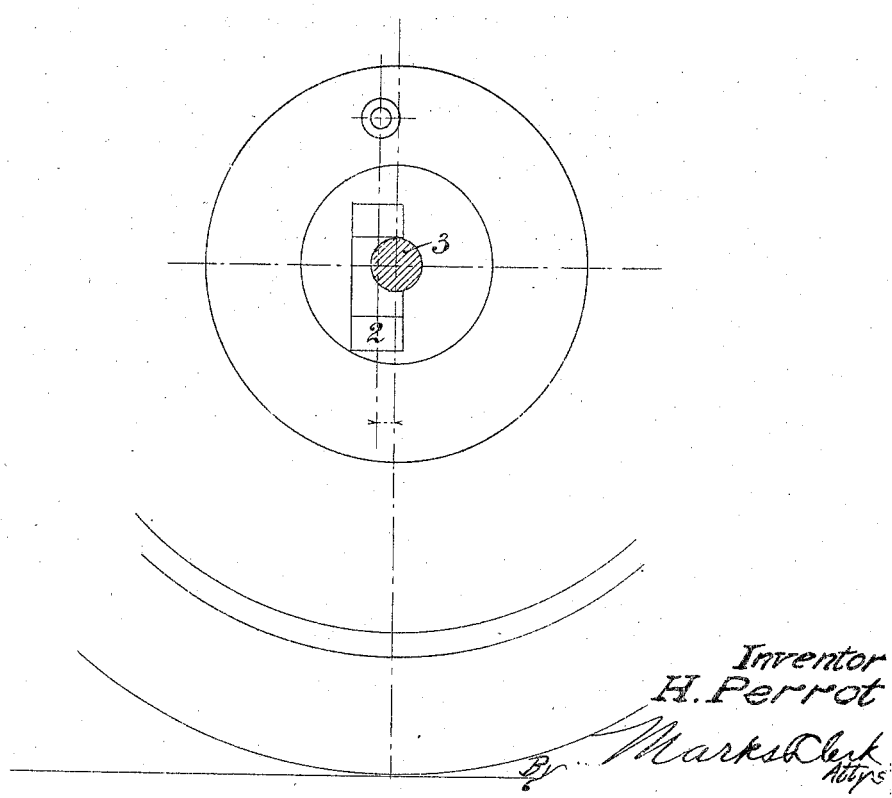

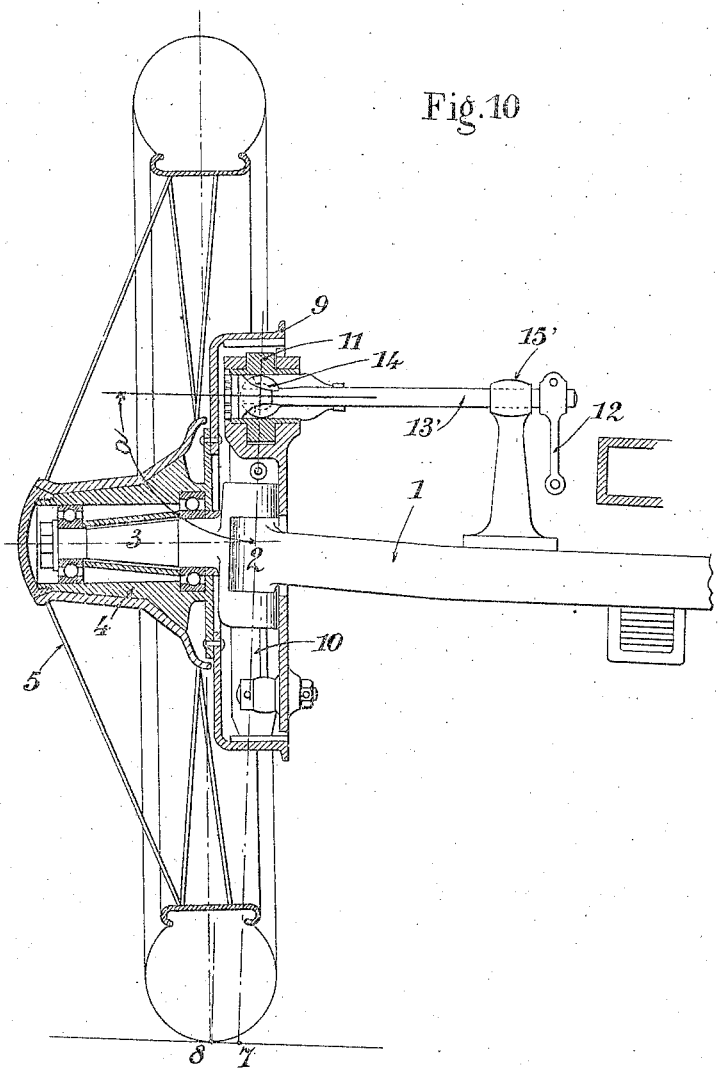

Patented July 21, 1925.

1,546,792

UNITED STATES PATENT OFFICE.

HENRI PERROT, OF PARIS, FRANCE.

FRONT-WHEEL BRAKE.

Application filed July 24, 1922. Serial No. 577,202.

*To all whom it may concern:*

Be it known that I, HENRI PERROT, citizen of the French Republic, residing at Paris, in the Republic of France, have invented new and useful Improvements in Front-Wheel Brakes, of which the following is a specification.

In the greater number of the known front wheel brakes, the axle pivots are inclined in such manner that their axes when extended will meet with the ground at the point of contact between the wheel and ground, or at a point adjacent the same, so that the elements of the steering gear shall not be obliged to support the stresses due to the braking. The amount of inclination of said axle pivots is determined by the constructional means employed. It is also advantageous as concerns the steering of the vehicle and chiefly for heavy vehicles and hauling wagons, that the said pivots should have the minimum inclination, for a greater inclination will give harder steering when turning the wheels, since one side of the vehicle must be raised, and the extent of the latter action will depend upon the angle of inclination and the steering angle.

This invention relates to improvements in front wheel brakes consisting firstly in so disposing the elements that the axis of the axle pivot, which may be displaced from the vertical line passing through the axis of the spindle, shall be vertical or very nearly so, and that the extension of said axis shall meet with the ground at a point adjacent the point of contact between wheel and ground, while admitting the use of all known types of wheels such as wheels with metal spokes, wood spokes, disc wheels and the like; and secondly, in disposing the universal joint for articulation so that one of its pivoting axes shall be in the prolongation of the pivot axis of the axle or parallel to the plane of the wheel, the latter being obviously inclined to a slight extent so as to afford the desired setting, or again, in an intermediate position, the axis of the cam coinciding with the axis of the Cardan shaft or not coinciding with the same but being parallel to said shaft.

The following description, together with the accompanying drawings which are given by way of example sets forth this invention.

Fig. 1 is a sectional view of one of the front or steering wheels of a motor vehicle provided with the brake mechanism.

Figs. 2 to 5 are detail views of the brake control;

Fig. 2 shows the cam in front view,

Fig. 3 one of the branches of the universal joint actuating the cam,

Fig. 4 the core of the joint and the cam, and

Fig. 5 the second branch of the universal joint whereupon is mounted the drivers' control device.

Figs. 6, 7 and 8 are elevational views of a modified form of the drive, wherein the vertical axis of the cam is displaced with respect to the vertical axis of the joint.

Figs. 6ª, 7ª and 8ª are respectively plan views corresponding to Figs. 6, 7 and 8.

Fig. 9 is a front view of a modified form wherein the axis of the axle pivot is displaced with reference to the vertical plane passing through the axis of the spindle.

Fig. 10 is a modified form of Fig. 1.

As shown in Fig. 1, the spindle 3 is movable upon the body of axle 1 on the pivot 2 which is perpendicular to the ground. Upon spindle 3 is movable the hub 4 of wheel 5 which is here represented with metal spokes but may be otherwise constructed. The plane of wheel 5 whereof the direction is shown at 6 upon the vertical plane of the section of the figure, is inclined to the vertical by the usual amount of setting which is given to the front wheels of motor vehicles. The pivot 2 being vertical, to obtain this result the axis of spindle 3 is somewhat inclined to the horizontal. The extension of the axis of the pivot 2 meets with the ground at a point 7 which is very near the point 8 of contact with the pneumatic tyre.

The hub 4 carries the brake drum 9 which is secured thereto. Within said drum are one or more brake shoes 10 which are brought into contact with the drum by means of cam 11 actuated by the lever 12 (connected with the brake mechanism), and the shaft 13, the universal joint 14 being interposed; shaft 13 is connected with the vehicle frame by the support 15 and a sliding junction with ball 16.

The centre 17 of the universal joint 14 is situated upon the axis of the axle pivot or at a point near the same. The axial plane 18 of cam 11, as may be observed in Fig. 4, which contains the vertical axis of the Cardan joint and consequently its centre 17, may be parallel to the plane 6 of the wheel 5 or may pass through the axis of the pivot 2, or again, may occupy intermediate positions and when the axial plane 18 of the cam makes an angle with the axis of the pivot, as it will when it is parallel to the plane 6 of the wheel, mounted as illustrated and described above, then a differentiating action in the braking effects of the steering wheels will be obtained when the brakes are used at the time of turning; that is to say, one of the steering wheels will be acted on harder by the brakes than the other. In many cases I prefer to make this angle such that the angle illustrated as "a" will be approximately 87°, which angle will remain substantially constant. Both differentiating and non-differentiating action of this character take place as explained in French Patent No. 526,849, published July 2, 1921, and granted to M. Jean Novak.

It is shown in Figs. 2 to 5 that the rotation of cam 11 is effected as follows. The shaft 13 when rotating will turn by means of the fork 19 the ball 14 of the joint which actuates the arm of the fork 20 secured to member 21; the latter is provided with teeth engaging the teeth 22 of an operating shaft shown as integral with cam 11 and the same is therefore actuated. Since the universal joint is disposed within a recess in the operating shaft for the cam or its equivalent, one may mount the whole device within the brake drum, and this will give a very satisfactory appearance to the wheel.

Figs. 6 to 8 and 6ª to 8ª show a modified form wherein the axial plane 18 of cam 11 is displaced, parallel to the pivoting axis of the universal joint 14, with respect to the center 17 of said joint. The said displacement can be effected within or without the Cardan axis with reference to the wheel axis.

Fig. 9 shows a modified form of construction of the elements of the invention wherein the axis of the axle pivot 2 is displaced with respect to the vertical plane passing through the axis of the spindle 3. Fig. 10 shows a modified form of the drive of the brake cam, the drive being herein effected by a shaft 13', horizontal or inclined, which may be actuated by the lever 12 and thus rotates in the support 15' secured to the main body of the axle 1, the upper part of said support forming a bearing.

Obviously, the devices hereinbefore described are susceptible of all desired modifications without departing from the principle of the invention.

Having now described my invention, what I claim as new and desire to secure by Letters Patent, is:

1. Means for operating brakes on a wheel carried by a spindle pivoted to an axle of a vehicle comprising; in combination, a brake drum carried by the wheel, a circular plate carried by the spindle and fitting over the opening of the drum and having brake shoes supported thereon, a cam support on said plate, a cam carried by said support and extending into operative relationship with said brake shoes, a shaft for actuating said cam, an element arranged in a recess of the shaft substantially in the plane of the cam and forming a universal joint between the shaft and cam, means for supporting said shaft, and means for actuating the shaft.

2. Means for operating brakes on a wheel carried by a spindle pivoted to an axle of a vehicle comprising; in combination, a brake drum carried by the wheel, a circular plate carried by the spindle and fitting over the opening of the drum and having brake shoes supported thereon, a support on said plate, a hollow operating shaft journaled in said support, a connecting member inside and pivoted to the shaft, an operating shaft extending into the hollow shaft and pivotally connected with said connecting member, means for supporting the shaft, and means for actuating the same.

3. Means for operating brakes on a wheel carried by a spindle pivoted to an axle of a vehicle comprising; in combination, a brake drum carried by the wheel, a circular plate carried by the spindle and fitting over the opening of the drum and having brake shoes supported thereon, a cam support on said plate, a cam member carried by said support and extending into operative relationship with said brake shoes, a connecting member pivotally supported by said cam member substantially in the plane of the cam portion and movably connected thereto, an operating shaft movably connected with said connecting member, means for supporting the shaft and means for actuating the same.

4. Means for operating brakes on a wheel carried by a spindle pivoted to an axle of a vehicle comprising; in combination, a brake drum carried by the wheel, a circular plate carried by the spindle and fitting over the opening of the drum and having brake shoes supported thereon, a cam support on said plate, a hollow cam member carried by said support and extending into operative relationship with said brake shoes, a connecting member smaller in diameter than the hollow part of said cam member and movably supported by a part of the cam member with a driving connection thereto, an operating shaft having one end extending within the hollow cam into movable engagement with said connecting member, means for movably supporting the other end of said shaft and means for actuating the same.

5. Means for operating brakes on a wheel carried by a spindle pivoted to an axle of a vehicle comprising; in combination, a brake drum carried by the wheel, a circular plate carried by the spindle and fitting over the opening of the drum and having brake shoes supported thereon, a cam support on said plate, a hollow cam member having notches in one end thereof, carried by said support and extending into operative relationship with said brake shoes, a connecting member positioned within the hollow part of the cam member and having in effect two sets of diametrically arranged grooves; a forked member for engaging one set of said grooves, said forked member having teeth on its periphery for engaging said notches in the end of the cam member, an operating shaft having one end forked to engage the other pair of grooves in the connecting member, means for slidably supporting the other end of said shaft, and means for actuating the shaft.

6. Means for operating brakes on a wheel carried by a spindle pivoted to an axle of a vehicle comprising; in combination, a brake drum carried by the wheel, a circular plate carried by the spindle and fitting over the opening of the drum and enclosing the brake shoes within the drum, said plate having a boss, a cam member supported by the boss but having portions extending through the boss into operative relationship with the brake shoes, an operating shaft, a connecting member carried by said cam and having a universal joint driving connection with the cam and shaft, the construction and arrangement of said joint parts being such that the pivoting axis of said universal joint may be coincident with the axial plane of the cam.

7. Mechanism for controlling brakes on a wheel of a vehicle comprising; in combination, a hollow cam member supported in co-operative relationship with the brakes, a ball shaped member carried by the cam member and having in effect two sets of grooves with means engaging one set of grooves for completing a movable driving connection with said cam member, an operating shaft having a forked end extending into the cam member to drivingly engage the other pair of grooves in the ball, a support for the other end of said shaft on a non-rotating part of the vehicle, and means for actuating said shaft.

8. Mechanism for controlling brakes on a wheel of a vehicle comprising; in combination, a cam member having a hole therethrough with supporting means to hold the cam in co-operative relationship with the brakes, a ball shaped member smaller in diameter than the hole through the cam and having annular grooves arranged at right angles, with means fitting in one groove on opposite sides of the ball for drivingly connecting the ball to the cam, an operating shaft having an end extending into the cam to fit the other groove on opposite sides of the ball, a movable joint support for the other end of the shaft on a non-rotating part of the vehicle, and means for actuating the shaft.

9. Mechanism for operating a front wheel brake including a support on the spindle and comprising, in combination, an operating shaft having an interior recess and journalled on the support, a connecting member in the recess, a normally coaxial shaft arranged to be operated to apply the brake and pivotally engaging said connecting member, and a part extending into the recess at the opposite end from the co-axial shaft and pivotally engaging the connecting member at right angles to the co-axial shaft and arranged to operate the operating shaft, the axes of the two connections to said connecting member being substantially at right angles to each other, forming a universal joint.

10. Mechanism for operating a front wheel brake including a support swivelling with the spindle and comprising, in combination, a cam, a shaft secured to the cam and journalled at both ends and formed with a recess, an operating shaft normally coaxial with the cam shaft, and a connecting member pivotally connected to the cam shaft and the operating shaft and arranged in the recess substantially in the plane of the cam.

11. Mechanism for operating a brake for a wheel swivelling about a generally vertical steering axis and comprising, in combination, two shafts normally coaxial and one of which swivels with the wheel, the latter shaft being formed with a recess, and a connecting member in said recess midway between the ends of said latter shaft and substantially in said steering axis, the connecting member being pivoted to the two shafts for movement about axes at right angles to each other to form a universal joint, the vertical one of said axes forming an acute angle with the steering axis.

12. Brake operating mechanism comprising, in combination, a hollow shaft carrying a cam, a member secured to one end of the shaft having a fork 20 extending into the shaft, a ball 14 having two grooves at right angles to each other and one of which grooves receives the fork 20, and an operating shaft 13 extending into the hollow shaft and having a fork 19 received in the other groove.

13. Operating mechanism for a brake for a wheel swivelling about a generally vertical steering axis and having a supporting plate swivelling with the wheel and comprising, in combination, a part carried by the plate and formed with a horizontal cylindrical bore, a relatively short shaft having a bearing in said bore, a normally co-axial shaft entering the end of said bore, and a connecting member within said bore, and substantially in the steering axis and pivotally connected to both shafts for movement about axes at right angles to each other to form a universal joint.

14. Operating mechanism for a brake for a wheel swivelling about a generally vertical steering axis and having a supporting plate swivelling with the wheel and comprising, in combination, a part carried by the plate and formed with a horizontal cylindrical bore, a relatively short shaft in said bore having a fork inside said bore, a normally coaxial shaft entering the bore and formed with a fork at right angles to the first fork, and a ball within the bore grooved to receive the two forks.

In testimony whereof I have signed my name to this specification.

HENRI PERROT.